United States Patent Office 3,144,441
Patented Aug. 11, 1964

3,144,441
10-LOWER ALKOXY-5H-DIBENZ[b,f]AZEPINES
Walter Schindler, Riehen, near Basel, and Hans Blattner, Basel, Switzerland, assignors to Geigy Chemical Corporation, Ardsley, N.Y., a corporation of Delaware
No Drawing. Filed Sept. 11, 1962, Ser. No. 223,300
Claims priority, application Switzerland Nov. 16, 1959
5 Claims. (Cl. 260—239)

The instant invention concerns new N-heterocyclic compounds.

This invention relates to compounds of formula

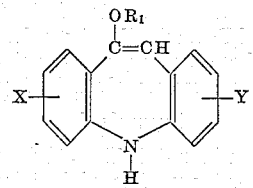
(I)

in which
X signifies hydrogen, chlorine, bromine, lower alkyl, or lower alkoxy,
Y signifies hydrogen, chlorine, bromine or lower alkyl, and
$R_1$ signifies lower alkyl.

These compounds are obtained in good yield when compounds of formula

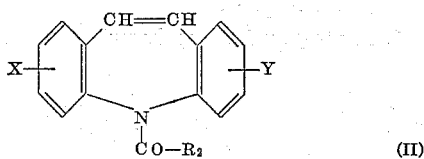
(II)

in which $R_2$ signifies lower alkyl and X and Y have the meanings given above, are reacted with bromine, whereby 5-acyl-10,11-dibromo-10,11-dihydrodibenz[b,f]azepines of formula

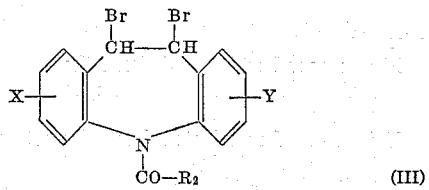
(III)

in which X, Y and $R_2$ have the meanings given above, are obtained, and the dibromo derivatives of Formula III are converted into compounds of general Formula I by treatment with at least two equivalents of an alkali metal lower alkanolate.

In this process, monobromoazepines of formula

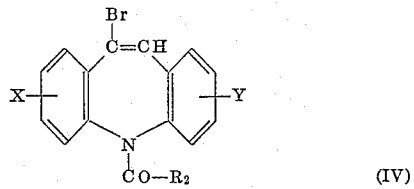
(IV)

in which X, Y and $R_2$ have the meanings given above, are first formed by elimination of hydrogen bromide. Such elimination may also be effected in a separate step under mild conditions, either by treatment with an alkali metal lower alkanolate at room temperature, or by treatment with other inorganic or organic bases such as, e.g., sodium or potassium hydroxide in alcoholic or aqueous-alcoholic solution or preferably in dioxan and also at room temperature. Under these mild conditions, monobromo azepines of general Formula IV do not react further and thus constitute the reaction products. In the warm, monobromo azepines of Formula IV react with alkali metal lower alkanolates to furnish compounds of Formula I, which under the same more drastic conditions are also obtained directly from the dibromo azepines of Formula III. For such conversion of bromo derivatives of either Formulae III and IV, a relatively large excess of alkali metal lower alkanolate is preferably used, i.e. about 4–10 mol per mol of azepine compound, in the alkanol corresponding to that of the alkanolate at or near its boiling temperature. Fairly long reaction times, e.g. between 12 and 48 hours, and high concentrations of alkali metal alkanolate are advised in order to achieve complete reaction. The acid residue —CO—$R_2$, e.g. an acetyl residue, suffers base catalyzed alcoholysis during the process, and an ester, e.g. an alkanol acetate is formed. Such alcoholysis consumes no alkali metal alkanolate and the formation of the compound of Formula I may be regarded as ended when all the bromine is present as alkali metal bromide.

Suitable lower alkanols for the alkanolate component and solvent are, for example, methanol, ethanol, n-propanol, n-butanol, isobutanol; methanol and ethanol being preferred if the resulting 10-alkoxy-5H-dibenz[b,f]azepines of Formula I are to serve as intermediates.

In the monobromo azepines of general Formula IV, and in the corresponding deacylated compounds formed during the reaction, the bromine atom is situated on a double bond and would therefore be expected to be quite inert towards bases such as those employed in the present process. The ready replaceability by an alkoxy group is therefore surprising and it is decisive for the success of the process. The resulting compounds of general Formula I have the character of enol-ethers and are readily hydrolysed to the corresponding keto-compounds. 10-alkoxy-5H-dibenz[b,f]azepines are useful as antioxidants; they are intermediates for the preparation of 5H-dibenz[b,f]azepin-10(11H)-ones of the Formula V.

Starting substances of the general Formula II are, for example, 5-acetyl-5H-dibenz[b,f]azepine, 5-acetyl-3-chloro-5H-dibenz[b,f]azepine, 5-acetyl-3-bromo-5H-dibenz[b,f]azepine, 5-acetyl-3-ethyl-5H-dibenz[b,f]azepine and 5-acetyl-3,7-dichloro-5H-dibenz[b,f]azepine. These compounds may be prepared by acetylation of the corresponding 5H-dibenz[b,f]azepines, but they may also, and preferably, be prepared directly from the corresponding 10,11-dihydro-5H-dibenz[b,f]azepines by acetylation, bromination of the N-acetyl derivatives in the 10 position by means of bromosuccinimide and elimination of hydrogen bromide under conditions which do not affect the N-acetyl group, e.g. by means of aqueous alcoholic alkali hydroxide solutions at temperatures between about 20 and 50° or, preferably, by means of tertiary organic bases such as hot collidine.

The following examples illustrate in more detail the operation of the process according to the invention. Parts therein mean parts by weight, and these are to parts by volume as g. are to cm.³. The temperatures are given in degrees centigrade.

*Example 1*

(*a*) 407 parts of bromine in 250 parts by volume of chloroform are dropped into a solution of 600 parts of 5-acetyl-5H-dibenz[b,f]azepine in 1200 parts by volume of chloroform at 5–10° while stirring. The decolourized solution is then cooled to −10° while stirring, when crystallisation of the 5-acetyl-10,11-dibromo-10,11-dihydro-5H-dibenz[b,f]azepine takes place. It is filtered off by suction and dried in vacuo. Melting point: 136–138°.

(*b*) 485 parts of the above dibromo compound are dissolved in 1500 parts by volume of dioxan at 40° and the solution is then cooled to 20°, when no crystallisation should occur. A solution of 76 parts of potassium hydroxide in 342 parts by volume of absolute alcohol is added at 20–25° with stirring over a period of 15–25 minutes. The reaction solution is subsequently stirred for approximately 14 hours at room temperature and then poured into 5000 parts of water. The 5-acetyl-10-bromo-5H-dibenz[b,f]azepine thereby crystallises out. It is filtered off by suction and recrystallised from alcohol. Melting point: 109–110°.

(c) 157 parts of 5-acetyl-10-bromo-5H-dibenz(b,f)azepine are introduced into a solution of 50 parts of sodium in 1000 parts by volume of absolute alcohol with vigorous stirring, and the solution is then boiled under reflux for 18 hours. After cooling, the reaction solution while stirring vigorously is poured into 5000 parts of water, when the crude product is precipitated. It is filtered off by suction and dissolved in ether. The ethereal solution is thoroughly washed with water, dried and evaporated. The residue is first fo all recrystallised from alcohol and then from ligroin, when 10-ethoxy-5H-dibenz-[b,f]azepine of melting point 132–133° is obtained.

10-methoxy-5H-dibenz[b,f]azepine, M.P. 124°, 10-n-butoxy-5H-dibenz[b,f]azepine, M.P. 113–114°, 10-methoxy-3,7-di-chloro-5H-dibenz[b,f]azepine, M.P. 182–183° and 2-methoxy-10-methoxy-5H-dibenz[b,f]azepine are similarly obtained.

*Example 2*

125 parts of the 5-acetyl-10,11-dibromo-10,11-dihydro-5H-dibenz[b,f]azepine prepared according to Example 1(a) are introduced into a solution of 135 parts of sodium methylate in 1,000 parts by volume of distilled methanol and the whole is boiled under reflux with stirring for 16 hours. Approximately 500 parts by volume of methanol are then distilled off and the remaining reaction mixture is boiled for a further 24 hours under reflux. After cooling, 500 parts of water are slowly added, the precipitated crystals are filtered off with suction, washed thoroughly with water and dried in vacuum at 60°. They are then recrystallised from 350 parts by volume of absolute ethanol and the 10-methoxy-5H-dibenz-[b,f]azepine of melting point 124° is obtained.

This application is a continuation-in-part of our co-pending patent application Serial Nos. 69,302 and 156,551, filed on November 15, 1960, and November 8, 1961, respectively, and both now abandoned.

5H-dibenz[b,f]azepine-10(11H)-ones of the general Formula V

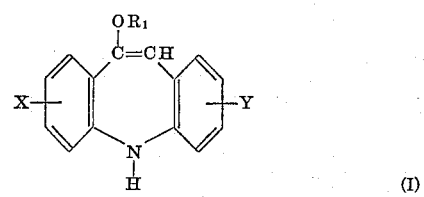

wherein X and Y have the meanings given with Formula I, are obtained in good yield from 10-alkoxy-5H-dibenz[b,f]azepines of Formula I by heating these for a short time, e.g. from 5 to 60 minutes in 0.5–5 N aqueous mineral acid, e.g. hydrochloric, sulfuric or phosphoric acid.

5H-dibenz[b,f]azepine-10(11H)-ones of Formula V are active as antioxidants.

Important compounds of general formula I are, e.g. 10-methoxy- or 10-ethoxy-5H-dibenz[b,f]azepine, their 3-chloro-, 4-bromo-, 3-ethyl-3,7-dimethyl- and 3,7-dichloro-derivatives, such 10-methoxy- and 10-ethoxy-compounds being preferred. Further compounds of Formula I are e.g. the 10-propoxy-, 10-isopropoxy-, 10-butoxy- and 10-amyloxy-derivative of 5H-dibenz[b,f]azepine and its 3-chloro-, 3-bromo, 3,7-dichloro, 3,7-dimethyl- and 3-ethyl-derivative. Preferred acids for the hydrolysis according to the invention are hydrochloric and trichloracetic acid.

The following examples illustrate in more detail the process whereby the compounds of Formula I are converted to those of Formula V. Parts therein mean parts by weight, and these are to parts by volume as g. are to cm.³. The temperatures are given in degrees centigrade.

*Example 3*

2 parts of 10-ethoxy-5H-dibenz[b,f]azepine are suspended in 20 parts by volume of 2 N hydrochloric acid and boiled under reflux for 10 minutes, when the suspended substance first of all liquefies and then becomes solid again. The reaction mixture is cooled, and the crude 5H-dibenz[b,f]azepine-10(11H)-one is filtered off by suction and washed with water until neutral. After recrystallisation from alcohol it melts at 145–146°.

The 3,7-dichloro-5H-dibenz[b,f]azepine - 10(11H) - one of melting point 318–320° is similarly obtained from 10-methoxy-3,7-dichloro-5H-dibenz[b,f]azepine.

What we claim is:

1. A compound of the formula

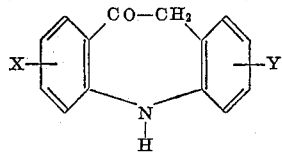

wherein
X is a member selected from the group consisting of hydrogen, chlorine, bromine, lower alkyl and lower alkoxy,
Y is a member selected from the group consisting of hydrogen, chlorine, bromine and lower alkyl, and $R_1$ is lower alkyl.
2. 10-ethoxy-5H-dibenz[b,f]azepine.
3. 10-methoxy-5H-dibenz[b,f]azepine.
4. 10-n-butoxy-5H-dibenz[b,f]azepine.
5. 10-methoxy-3,7-dichloro-5H-dibenz[b,f]azepine.

No references cited.